Sept. 9, 1930.   H. BECKER   1,775,586
PARKING LIGHT
Filed Dec. 24, 1928
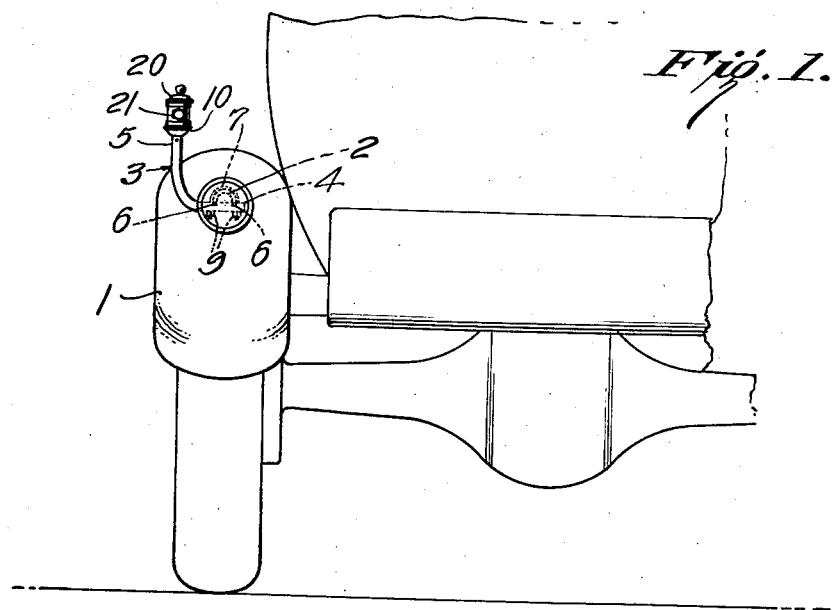
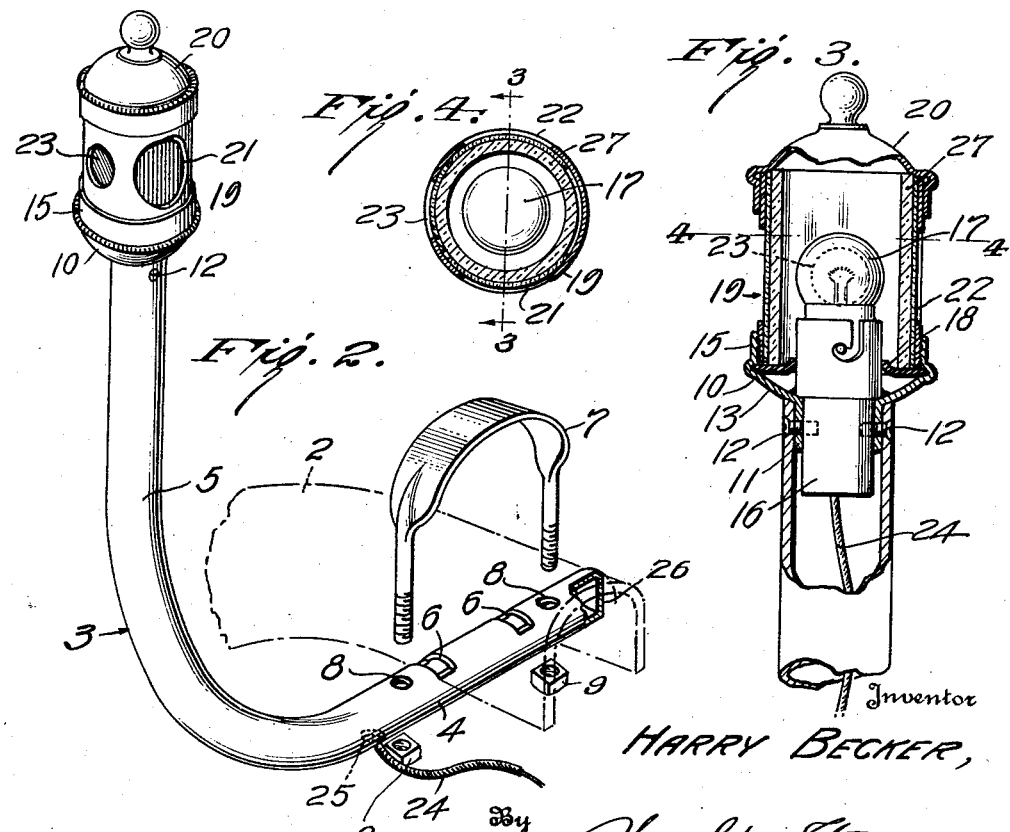
Inventor
HARRY BECKER,
By Harold Strauss
Attorney Patented Sept. 9, 1930

1,775,586

UNITED STATES PATENT OFFICE

HARRY BECKER, OF BALTIMORE, MARYLAND, ASSIGNOR OF ONE-FOURTH EACH TO JACOB HAMBURGER AND CLARENCE K. FOX, BOTH OF BALTIMORE, MARYLAND

PARKING LIGHT

Application filed December 24, 1928. Serial No. 328,232.

My invention relates to signal lights and more particularly to a parking light for automobiles.

It is an object of the invention to provide an improved light of this character which may readily be attached to an automobile.

Another object of my invention is to provide a parking light which may be quickly and easily attached to the stop light bracket of an automobile, without requiring the boring of any hole.

A further object is to provide a parking light which may be seen from the rear, front, or side of an automobile, which is attractive in appearance, and comparatively cheap to manufacture.

With these and other objects in view the invention comprises certain novel features, and combinations and arrangement of parts as will be more fully pointed out in the specification and appended claims.

In the accompanying drawings forming part of this application,

Figure 1 is a rear elevation of an automobile showing my improved parking light attached thereto.

Figure 2 is a perspective view of my parking light showing the bracket to which it is attached in dotted lines.

Figure 3 is a vertical section through the lamp housing, and upper end of the bracket, and Figure 4 is a section on the line 4—4 of Fig. 3.

In practically all types of parking lights with which I am familiar, the light has been attached to the left rear fender of an automobile, and it has been necessary to drill a hole in the fender so that the light could be attached. This requires machine work which the average car owner is not able to do, and hence it is necessary for him to pay to have the work done.

On the present models of automobiles the rear light is located just in back of the left rear fender, and is supported by a bracket secured either to the chassis or directly to the fender. To provide a parking light which could readily be attached to this bracket without the use of any tools, except a wrench, is the main object of this invention, and the construction of my improved light will now be described.

In Figure 1 of the drawings is shown an automobile in which 1 indicates the left rear fender, having secured thereto a rear light bracket 2, formed in the shape of a channel iron, and having its parallel faces in a vertical plane, although as stated above this bracket might be secured to the chassis.

My improved parking light comprises a bracket 3, preferably made as a hollow tube, and bent between its ends to form a horizontal portion 4, and a vertical portion 5. The upper surface of portion 4 is provided with suitable means to engage the rear light bracket. As shown it has two slots 6, one slot being spaced a short distance from the end of the bracket, and the second slot being spaced from the first slot a distance equal to the width of the channel 2, so that when the parking light is placed in position, with the portion 4 below the bracket 2, the edges of the vertical flanges of the bracket will be received in the slots. It is to be understood that I do not limit myself to the exact construction shown, for in case the bracket 2 is in the form of a tube, then it will be necessary to have only one slot 6, to fit partially around the same.

A U-bolt 7 is placed over top of the bracket 2 and its vertical legs pass down through openings 8 in the portion 4, located adjacent the slots 6. Nuts 9 are screwed on the bolt 7, and bearing against the lower surface of portion 4 serve to clamp the parking light to the rear light bracket.

Secured to the upper end of vertical portion 5 is a lamp housing base 10. This base member is formed with a depending tubular neck 11, closely fitting the bore of portion 5, and secured thereto by screws 12. Extending outwardly from portion 11, over the upper edge of portion 5, is an annulus 13, formed with a vertical collar 15, which is interiorly screw threaded. A lamp socket 16, adapted to receive a lamp 17, fits within the neck 11 and is soldered thereto. A leather disc 18 rests upon a shoulder of annulus 13 and has a central opening to receive the upper part of the lamp socket, this disc being provided to prevent water and dirt reaching the lower part of the socket and also as a gasket.

A wire 24 extends from the electric circuit of the automobile, enters an opening 25 in bracket 3, and extends upwardly therethrough, connecting to socket 16. The lamp circuit is completed through the socket shell, base 13, bracket 3, stop light bracket 2, and the fender, to the frame of the automobile as will be well understood.

A tubular lamp housing 19 is threaded into the flange 15 and has its upper end closed by a cap 20. A tubular glass member 27, of slightly less diameter than the inner diameter of the housing 19 is inclosed within the same, with its upper end bearing against cap 20, and when the housing 19 is in place the glass member rests upon the gasket 18.

The housing 19 is provided with three openings 21, 22 and 23, the opening 21 being toward the rear of the automobile, the opening 22 toward the front and the opening 23 toward the left, when the device is viewed from the rear. Pieces of translucent material are placed between the lamp housing and the glass member 27, a piece of different color being provided for each of the openings 21, 22, 23. Thus a piece of red material is placed inside of opening 21, a piece of white material inside of opening 22, and a piece of green material inside of opening 23. From an inspection of Figure 1, it will be seen that the lamp housing extends above the top of the fender near which it is located, and therefore a driver of an automobile, approaching from the front, a car equipped with my device will see a white light, if approaching from the rear he will see a red light, and while passing will see a green light. The free end of portion 4 of the bracket 3 may be closed as at 26 to exclude water and dirt.

From the above description it will be seen that I have constructed a parking light which can quickly and easily be attached to any automobile without requiring any mechanical skill, and which is neat and attractive in appearance. As above stated the design of the slots 6 will have to be made to fit the rear light bracket of the make of automobile for which my improved light is intended, so therefore I do not limit myself to the exact shape set forth, but consider myself at liberty to make this and other changes that fairly fall within the limit and scope of the appended claims.

I claim:

1. In an automobile parking light, a light casing and a standard, said standard being tubular throughout its length and being bent to form two portions, angularly disposed to each other, one of said portions supporting the light, and the other portion being suitably shaped for engagement with a bracket of the automobile, and means adapted to engage the bracket and standard to secure the standard to the bracket.

2. In an automobile parking light, a light casing and a standard, said standard being tubular throughout its length and being bent to form two portions, angularly disposed to each other, one of said portions supporting the light, and the other portion being suitably shaped for engagement with a bracket of the automobile, and means adapted to engage the bracket and pass through openings in the standard to secure the standard in position.

In testimony whereof I affix my signature.

HARRY BECKER.